Patented Feb. 17, 1948

2,436,137

UNITED STATES PATENT OFFICE 2,436,137

PROCESS FOR PRODUCING MERCAPTANS

Charles Bedford Biswell, Woodstown, N. J., assignor to E. I. du Pont de Nemours & Company, Wilmington, Del., a corporation of Delaware No Drawing. Application August 14, 1944, Serial No. 549,479

3 Claims. (Cl. 260—609)

This invention relates to organic compounds containing thiol groups. More particularly it relates to a process for preparing such compounds containing two thiol groups.

Dithiols have been prepared by the reaction of alkylene dihalides with sodium hydrosulfide, but the yields obtained are not as high as desirable for the use of such a process on a commercial scale. Another process involves the saturation of the reaction mixture of alkylene dihalide and sodium hydrosulfide in a solvent with hydrogen sulfide at low temperature, followed by heating in a closed reaction vessel. This method improves the yield of dithiol but hydrogen sulfide is relatively expensive and for this reason the process is not commercially attractive.

An object of this invention, therefore, is to provide a process for making dithiols in improved yields. Another object is to provide a process which can be carried out economically on a commercial scale. Other objects will appear hereinafter.

These objects are accomplished by the process of this invention which comprises reacting, in a closed system, an alkylene dihalide, an alkali metal hydrosulfide, and a non-oxidizing acid having an ionization constant greater than $10^{-7}$. The term "non-oxidizing" as used herein means non-oxidizing to hydrogen sulfide under the conditions of the reaction.

The more detailed practice of the invention is illustrated by the following examples, wherein parts given are by weight. There are, of course, many forms of the invention other than these specific embodiments.

Example I

This example illustrates the preparation of ethanedithiol by the reaction of ethylene dichloride, hydrochloric acid, and excess sodium hydrosulfide in aqueous solution.

A mixture of 2540 parts of sodium hydrosulfide of 90.6% purity, 4298 parts of water and 1000 parts of ethylene dichloride is placed in a pressure vessel equipped with a mechanical stirrer. The reaction vessel is closed, the mixture stirred at room temperature and 732 parts of concentrated hydrochloric acid (equivalent to 271 parts of hydrogen chloride) is slowly injected into the mixture. When the acid is all injected, the pressure in the reactor reaches 100 lbs. per sq. in. The temperature of the reaction mixture is raised to 95° C. during two hours and held there for three hours. At this reaction temperature, the pressure is 220–230 lbs. per sq. in. The reaction vessel is cooled, vented to relieve excess pressure and the reaction product removed. The mixture, which contains some black solid, is acidified with hydrochloric acid and the oily layer of crude ethanedithiol separated and washed with water. The yield of crude thiol amounts to 760 parts. Analysis: Calculated for $C_2H_6S_2$; S (thiol), 68.1%; found, 60.5%. Fractionation of the dried crude product gives a yield of ethanedithiol boiling up to 71° C. at 50 mm. pressure (mostly at 68 to 71° C.) amounting to 67.1% of theory.

Example II

This example illustrates the use of carbon dioxide in the preparation of ethanedithiol from ethylene dichloride and sodium hydrosulfide in aqueous solution.

A steel reaction vessel fitted with a mechanical stirrer is charged with 1300 parts of an aqueous solution containing 38.9% sodium hydrosulfide, 500 parts of water and 356 parts of ethylene dichloride. The reaction vessel is closed and 10 parts of carbon dioxide introduced from a cylinder, whereupon the pressure in the reaction vessel is 105 lbs. per sq. in. The mixture is agitated and heated to 80–85° C. and held there for six hours. At this temperature the internal pressure is 210 lbs. per sq. in. At the end of the reaction period the vessel is cooled, vented to release excess pressure and the contents discharged. The reaction mixture is filtered, the oil layer separated and washed once with 200 parts of water. The crude product amounts to 307 parts. Distillation of 300 parts of this crude product yields 252 parts of ethane-dithiol boiling at 66–75° C. at 50 mm. pressure which corresponds to a yield of 76.4% of theory (based on ethylene dichloride). When the procedure of this example is carried out on a semi-plant scale, yields of ethanedithiol amounting to 80% of theory are obtained.

Example III

This example illustrates the preparation of 2,3-dimercaptopropanol by the reaction of glyceral dibromohydrin with sodium hydrosulfide in the presence of carbon dioxide in methyl alcoholic solution, in which the sodium hydrosulfide is formed by the action of hydrogen sulfide on sodium hydroxide.

A container equipped with means for cooling its contents is charged with 1000 parts of methyl alcohol and 177 parts of flake sodium hydroxide is added while the temperature of the mixture is maintained at 40 to 45° C. The resulting methyl alcoholic solution is cooled to 20–25° C. and saturated with hydrogen sulfide. The solution is then cooled to 15° C. and 298 parts of glycerol dibromohydrin is added while the mixture is agitated. This charge is then placed in a steel reaction vessel, the vessel closed and carbon dioxide introduced from a cylinder until a gauge pressure of 50 lbs. per sq. in. is obtained. The mixture is heated to 60–70° C. and held at this temperature (at a pressure of 65 lbs. per sq. in.) for four hours. At the end of this period the reaction vessel is cooled, vented to relieve excess pressure and the reaction mixture discharged. The crude mixture is acidified (to Congo red) with hydrochloric acid, filtered, methyl alcohol stripped off, washed with water and extracted with chloroform. The chloroform solution is distilled and after removal of the chloroform 68 parts of 2,3-dimercaptopropanol is obtained. This corresponds to a yield of 40.5% of theory, based on the dibromohydrin.

By the use of a procedure similar to that described in the preceding paragraph, with the exception that sufficient carbon dioxide is added to the reaction vessel to obtain a pressure of 100 lbs. per sq. in. at the reaction temperature of 60–65° C. a yield of 2,3-dimercaptopropanol amounting to 58.5% of theory is obtained.

The examples illustrate the reaction of ethylene dichloride and glycerol dibromohydrin with sodium hydrosulfide; however, any other aliphatic dihalide may be used in the process of this invention. Examples of other dihalides which may be used include; dichlorides such as glycerol 2,3-dichlorohydrin, 1,2-dichloropropane and hexamethylene dichloride, dibromides such as 1,3-dibromopropane, 1,3-dibromobutane, 2,5-dibromohexane, and iodides such as ethylene diiodide.

The sodium hydrosulfide described in the examples can be replaced if desired by other alkali metal hydrosulfides such as ammonium hydrosulfide or potassium hydrosulfide. It is essential to use at least a 20–25% excess of alkali metal hydrosulfide in this process. This excess suppresses sulfide formation and increases thiol formation. It also suppresses the formation of sodium sulfide in the reaction mixture. This excess alkali metal hydrosulfide is an excess over both the amount required to react with all the alkylene dihalide and the amount stoichiometrically equivalent to the non-oxidizing acid used. It is preferable that a 40–50% excess of hydrosulfide be used to obtain maximum yields.

In addition to hydrochloric acid and carbon dioxide as specifically described in the examples, any other acid having an ionization constant greater than $10^{-7}$ and which does not oxidize hydrogen sulfide under the conditions of the reaction may be used. Among other such acids which may be specifically mentioned are acetic acid, dilute sulfuric acid, phosphoric acid, etc.

The amount of acid used is that which will produce a pressure of at least 5 to 10 lbs. per sq. in. at the operating temperature. It is preferred to use an amount of acid which will produce a pressure of 50 to 100 lbs. per sq. in. at room temperature (with the corresponding higher pressures at the particular operating temperature used). Higher pressures may be used if desired. There is no known upper limit other than that which the reaction vessel will withstand, but no advantage is realized in the use of extremely high pressures. Since the operating pressure is also dependent on the temperature at which the reaction is carried out, the amount of acid to be used is also dependent on the operating temperature. For example, with higher operating temperatures, smaller quantities of acid are required to give the desired operating pressure.

The reaction can be carried out over a wide range of temperatures. Reaction takes place at temperatures as low as 30° C. and as high as 120° C. The only known upper limit is that temperature at which the ingredients decompose. In general it is preferred to use reaction temperatures of 60–100° C. At 30° C. the reaction of glycerol dibromohydrin with sodium hydrosulfide requires 24 to 30 hours, while at 60–65° C. only 4 to 6 hours are required. In the preparation of ethanedithiol a reaction period of three hours is required at a temperature of 95–100° C., while six hours are required at 80–85° C.

Water and methyl alcohol have been specifically described as reaction media in the examples. However, any other low molecular weight alcohol or mixture of alcohols and water, in which the alkali metal hydrosulfide is sufficiently soluble, may be used. The alcohol used should have a boiling point sufficiently lower than that of the reaction product to permit its easy separation.

The above description and examples are intended to be illustrative only. Any modification thereof or variation therefrom which conforms to the spirit of the invention is intended to be included within the scope of the claims.

What is claimed is:
1. Process for the preparation, in a closed system, of aliphatic dithiols which comprises adding carbon dioxide to a mixture of an aliphatic dihalide having the halogens as the only reacting groups and sodium hydrosulfide in 40–50% excess of that equivalent to the carbon dioxide and the dihalide, until the thereby induced pressure amounts to 50–100 pounds per square inch and heating the reaction mixture at 60–100° C.

2. Process which comprises introducing carbon dioxide into a mixture of ethylene dichloride, an inert liquid, and sodium hydrosulfide in 40–50% excess of that equivalent to the carbon dioxide and ethylene dichloride, until the pressure amounts to 50–100 pounds per square inch, heating the reaction mixture at 60–100° C., and isolating the ethanedithiol formed.

3. Process for the preparation of 2,3-dimercaptopropanol which comprises introducing carbon dioxide into a mixture of glycerol dibromohydrin, an inert liquid, and sodium hydrosulfide in 40–50% excess of that equivalent to the carbon dioxide and glycerol dibromohydrin, until the pressure amounts to 50–100 pounds per square inch, heating the reaction mixture at 60–100° C., and isolating the 2,3-dimercaptopropanol formed.

CHARLES BEDFORD BISWELL.

REFERENCES CITED

The following references are of record in the file of this patent:

UNITED STATES PATENTS

| Number | Name | Date |
| --- | --- | --- |
| 1,825,662 | Hale | Oct. 6, 1931 |
| 2,075,295 | Loder | Mar. 30, 1937 |
| 2,147,400 | Clark | Feb. 14, 1939 |
| 2,277,359 | Schrim | Mar. 24, 1942 |

OTHER REFERENCES

Tucker et al., "Journal Amer. Chem. Soc.," vol. 55, page 780 (1933).

Hall, "Journal American Chem. Soc.," vol. 65, pages 1466–1468 (1943).